(12) United States Patent
Heeter et al.

(10) Patent No.: US 11,828,197 B2
(45) Date of Patent: Nov. 28, 2023

(54) OUTLET GUIDE VANE MOUNTING ASSEMBLY FOR TURBINE ENGINES

(71) Applicant: Rolls-Royce North American Technologies Inc., Indianapolis, IN (US)

(72) Inventors: Robert Heeter, Noblesville, IN (US); Daniel E. Molnar, Jr., Lebanon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 10 days.

(21) Appl. No.: 17/541,752

(22) Filed: Dec. 3, 2021

(65) Prior Publication Data

US 2023/0175408 A1 Jun. 8, 2023

(51) Int. Cl.
*F01D 9/04* (2006.01)
*F02K 3/06* (2006.01)
*F01D 25/24* (2006.01)

(52) U.S. Cl.
CPC ........... *F01D 9/042* (2013.01); *F01D 25/246* (2013.01); *F02K 3/06* (2013.01); *F05D 2220/323* (2013.01); *F05D 2230/60* (2013.01); *F05D 2240/12* (2013.01); *F05D 2240/80* (2013.01)

(58) Field of Classification Search
CPC ..... F01D 9/00; F01D 9/02; F01D 9/04; F01D 9/041; F01D 9/042; F01D 25/24; F01D 25/246; F05D 2260/30; F05D 2260/31; F05D 2240/12; F05D 2240/80; F05D 2220/323; F05D 2230/60; F02K 3/06
See application file for complete search history.

(56) References Cited

U.S. PATENT DOCUMENTS

| | | | |
|---|---|---|---|
| 4,832,568 A | 5/1989 | Roth et al. | |
| 5,074,752 A | 12/1991 | Murphy et al. | |
| 5,494,404 A | 2/1996 | Furseth et al. | |
| 6,371,725 B1 | 4/2002 | Manteiga et al. | |
| 7,118,331 B2 | 10/2006 | Shahpar | |
| 7,444,802 B2 | 4/2008 | Perry | |
| 7,722,321 B2 | 5/2010 | Lhoest et al. | |
| 7,959,408 B2 | 6/2011 | Belmonte | |
| 8,469,662 B2 | 6/2013 | Lebrun et al. | |
| 9,091,174 B2 | 7/2015 | Bagnall | |
| 9,127,559 B2 * | 9/2015 | Lord | F01D 9/042 |
| 9,303,520 B2 | 4/2016 | Hasting et al. | |
| 9,303,531 B2 | 4/2016 | Hasting et al. | |
| 9,506,361 B2 | 11/2016 | Fielding et al. | |
| 10,247,018 B2 | 4/2019 | Topol et al. | |
| 10,458,261 B2 | 10/2019 | Got et al. | |
| 10,738,627 B2 | 8/2020 | Gallagher et al. | |
| 10,907,489 B2 | 2/2021 | Papin et al. | |
| 2016/0208629 A1 * | 7/2016 | Bergman | F01D 11/08 |
| 2017/0184124 A1 * | 6/2017 | Moniz | F04D 29/644 |
| 2020/0072072 A1 * | 3/2020 | Dyer | F01D 25/246 |
| 2021/0140375 A1 * | 5/2021 | Zecha | F01D 9/042 |

* cited by examiner

Primary Examiner — Elton K Wong
(74) Attorney, Agent, or Firm — Barnes & Thornburg LLP

(57) ABSTRACT

A guide vane assembly includes a fan case, a vane, and a retention ring. The fan case extends circumferentially partway about an axis. The vane extends radially inward away from the fan case and is coupled to the fan case. The retention ring extends circumferentially partway about the axis and is coupled with the fan case and supports the vane.

20 Claims, 10 Drawing Sheets

OUTLET GUIDE VANE MOUNTING ASSEMBLY FOR TURBINE ENGINES

STATEMENT REGARDING FEDERALLY SPONSORED RESEARCH OR DEVELOPMENT

Embodiments of the present disclosure were made with government support under Contract No. FA865019F2078 awarded by the U.S. Air Force. The government may have certain rights.

FIELD OF THE DISCLOSURE

The present disclosure relates generally to gas turbine engines, and more specifically to fan assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a fan assembly positioned within an inlet duct of the gas turbine engine. The fan assembly includes rotating blades that that force air into the compressor section of the engine, as well as potentially providing additional thrust via forcing air around the engine core through bypass ducts. Typical fan assemblies further include outlet guide vanes located downstream of the rotating blades to reorient the forced air produced by the rotating blades of the fan assembly. Some fan assembly designs must be wholly disassembled and reassembled for repair or replacement of components which may be labor and time intensive.

SUMMARY

The present disclosure may comprise one or more of the following features and combinations thereof.

According to an aspect of the present disclosure, a gas turbine engine assembly includes a bypass structure, a core casing, and a guide vane assembly. The bypass structure arranged circumferentially about an axis. The core casing extends circumferentially about the axis and is located radially inward of the bypass structure to define a flow path radially between the bypass structure and the core casing. The guide vane assembly is coupled with the bypass structure and configured to be removed radially away from the bypass structure and the core casing.

In some embodiments, the guide vane assembly includes a split fan case segment, a vane, and a split retention ring. The split fan case segment extends circumferentially partway about the axis. The vane extends radially inward away from the split fan case segment. The split retention ring segment extends circumferentially partway about the axis. The split fan case segment may be coupled with the bypass structure. The vane extends between a radially inner end that is supported on the core casing and a radially outer end that is supported by the split fan case segment. The split retention ring segment is coupled with the split fan case segment and engaged with the radially outer end of the vane to block radial movement of the vane away from the split fan case segment.

In some embodiments, the split fan case segment includes a fan case body and a fastener. The fastener extends radially through the fan case body and into the split retention ring segment to removably couple the split retention ring segment with the fan case body.

In some embodiments, the split fan case segment further includes a pin. The pin extends axially into the fan case body and the vane to block movement of the vane relative to the fan case body.

In some embodiments, the core casing is formed to include a first axial lip and a second axial lip spaced apart from the first axial lip to define an opening between the first axial lip and the second axial lip. The radially inner end of the vane is located in the opening and engages the first axial lip and the second axial lip.

In some embodiments, the vane includes an airfoil and a platform that extends circumferentially away from the airfoil to define the radially outer end of the vane. The split retention ring segment includes a band fastened with the split fan case segment and a flange that extends axially away from the band. The flange of the split retention ring segment engages and supports the platform included in the vane.

In some embodiments, the platform is formed to include a cutout that extends radially and axially into the platform. The split retention ring segment includes an anti-rotation feature coupled with one of the band and the flange. The anti-rotation feature extends into the cutout to block circumferentially movement of the vane relative to the split retention ring segment.

In some embodiments, the vane includes an airfoil, an outer platform that extends circumferentially partway about the axis, and an inner platform that extends circumferentially partway about the axis. The outer platform includes a first axial end and a second axial end spaced apart axially from the first axial end. The first axial end is coupled with the split fan case segment for movement therewith. The second axial end is interlocked between the split fan case segment and the split retention ring segment.

In some embodiments, the vane is simply supported by the core casing without being coupled to the core casing to allow the vane to move radially outward with the split fan case segment away from the core casing during removal of the guide vane assembly from the bypass structure. In some embodiments, the radially outer end of the vane is coupled to the split retention ring segment at a first axial end and coupled with the split fan case segment at a second axial end.

According to another aspect of the disclosure, a guide vane assembly includes a split fan case segment, a vane, and a split retention ring. The split fan case segment extends circumferentially partway about an axis. The vane extends radially inward away from the split fan case segment. The vane includes an airfoil and an outer platform that has a first axial end and a second axial end spaced apart from the first axial end. The first axial end is coupled with the split fan case segment for movement with the split fan case segment. The split retention ring segment extends circumferentially partway about the axis. The split retention ring segment is coupled with the split fan case segment and engaged with the second axial end of the outer platform included in the vane to interlock the outer platform of the vane between the split fan case segment and the split retention ring segment.

In some embodiments, the split fan case segment includes a fan case body and a fastener. The fastener extends radially through the fan case body and into the split retention ring segment to couple the split retention ring segment with the fan case body.

In some embodiments, the split fan case segment includes a fan case body and a fastener. The fastener extends axially into the fan case body and the first axial end of the outer platform included in the vane to couple the vane with the fan case body.

In some embodiments, the split retention ring segment is removably coupled with the split fan case segment to allow for radial translation of the split retention ring segment away from the split fan case segment. In some embodiments, the split retention ring segment includes a band fastened with the split fan case segment and a flange that extends axially away from the band. The flange of the split retention ring segment engages and supports the outer platform included in the vane.

In some embodiments, the outer platform is formed to include a cutout that extends radially and axially into the outer platform. The split retention ring segment may include an anti-rotation feature coupled with at least one of the band and the flange, and the anti-rotation feature extends into the cutout.

In some embodiments, the anti-rotation feature comprises a tab that extends radially away from the flange and axially away from the band. In some embodiments, the split retention ring segment defines a portion of an air flow path in the gas turbine engine.

According to another aspect of the present disclosure, a method may include a number of steps. The method may include coupling a first axial end of an outer platform included in a vane to a split fan case segment, translating radially a split retention ring segment into engagement with the split fan case segment and a second axial end of the outer platform included in the vane, and coupling the split retention ring segment with the split fan case segment after the translating step.

In some embodiments, the step of coupling the split retention ring segment with the split fan case segment includes inserting a fastener radially inward through the split fan case segment and into the split retention ring segment.

In some embodiments, the method further includes moving the split fan case segment, split retention ring segment, and the vane radially inward together toward a central axis with a rotatable fan installed on a gas turbine engine and coupling the split fan case segment with the gas turbine engine while the rotatable fan remains installed on the gas turbine engine.

These and other features of the present disclosure will become more apparent from the following description of the illustrative embodiments.

DETAILED DESCRIPTION OF THE DRAWINGS

Figure 1:
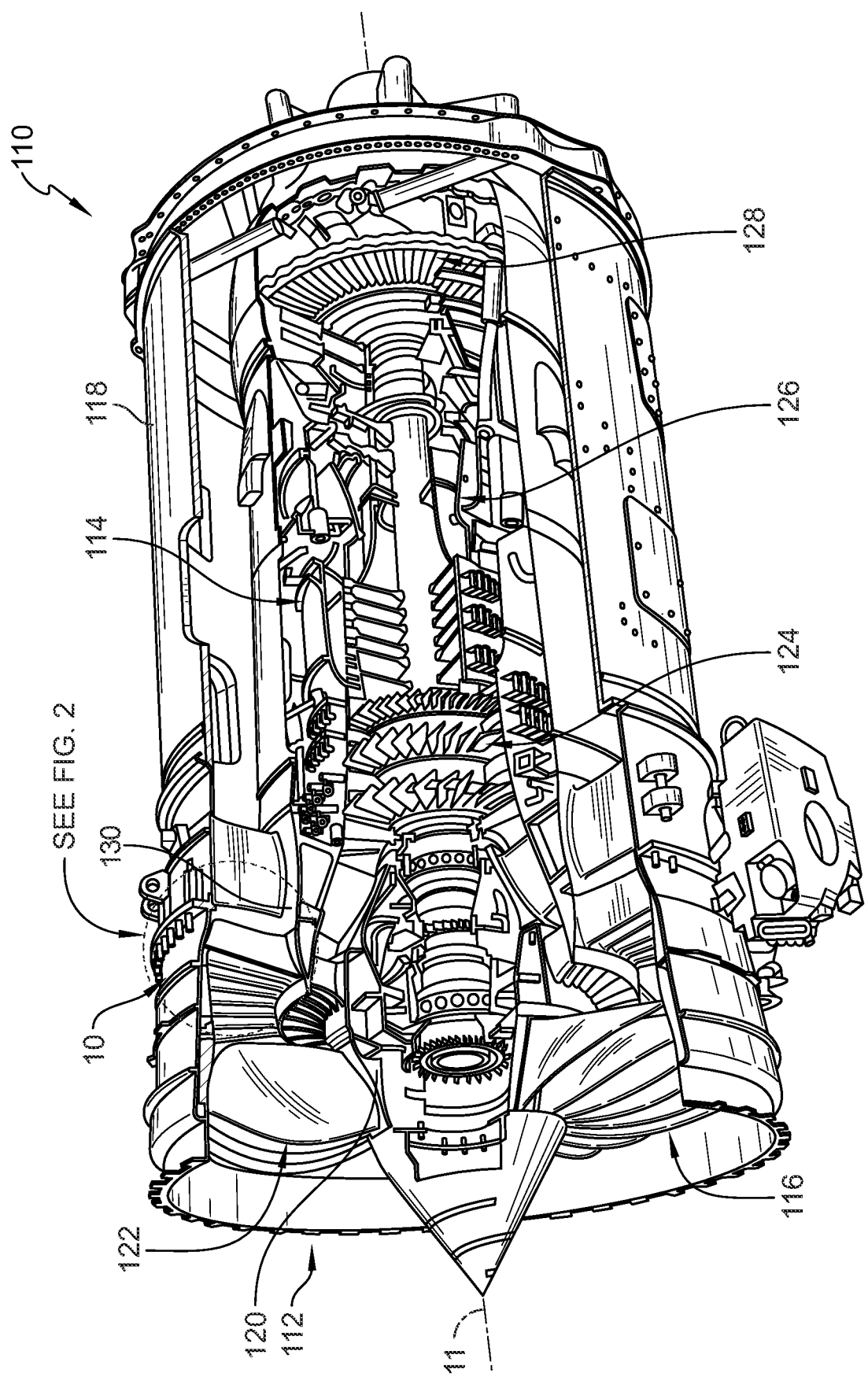
FIG. 1 is a cutaway view of a gas turbine engine that includes a fan assembly and an engine core having a compressor, a combustor, and a turbine, the fan assembly having a plurality of fan blades extending radially outward relative to a central axis and a guide vane assembly in accordance with the present disclosure located downstream of the fan blades to orient the air propelled by the fan blades.

For the purposes of promoting an understanding of the principles of the disclosure, reference will now be made to a number of illustrative embodiments illustrated in the drawings and specific language will be used to describe the same.

Figure 2:
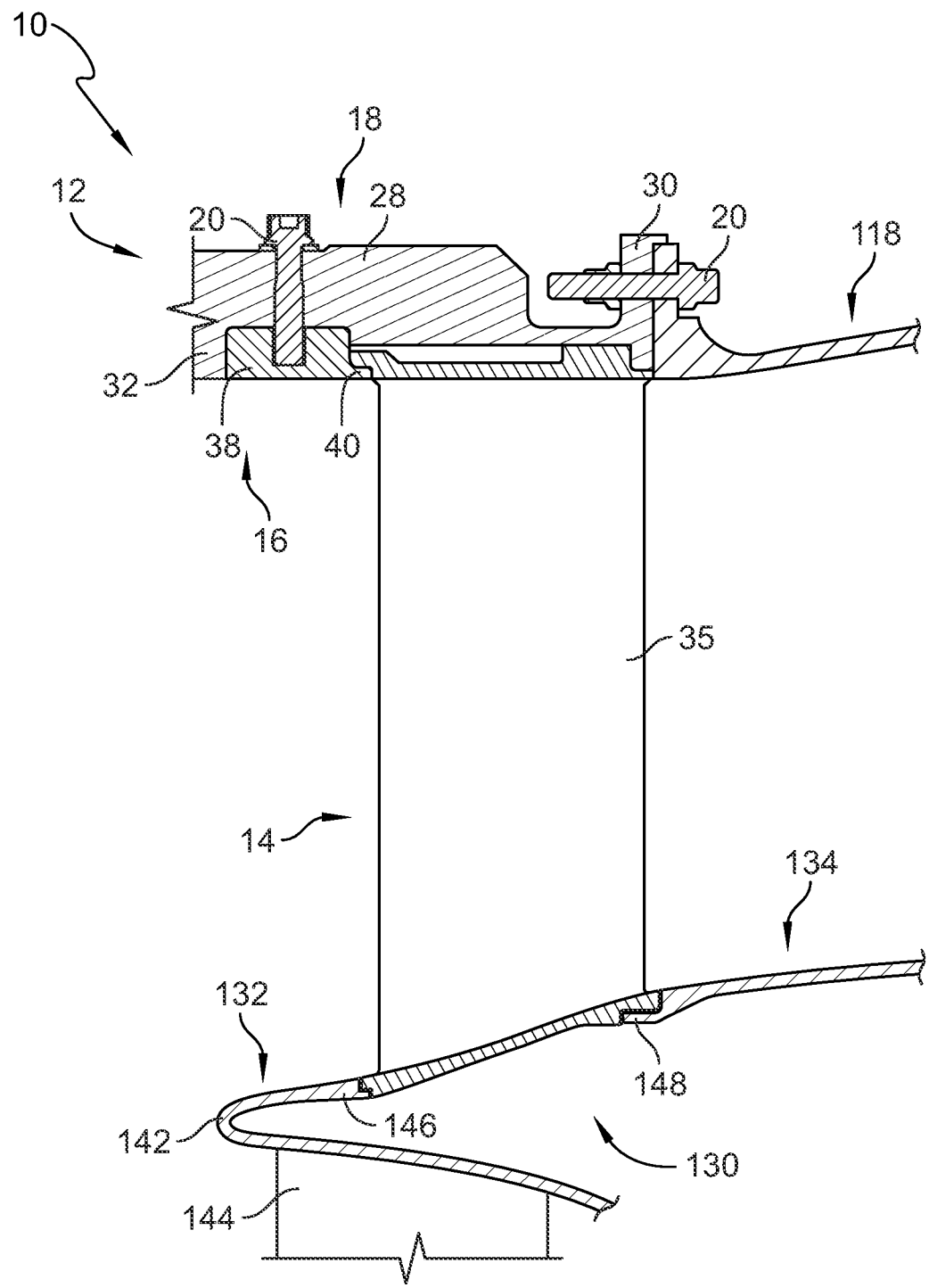
FIG. 2 is a cross-sectional view of the gas turbine engine of FIG. 1 showing the guide vane assembly that includes a split fan case segment coupled to a bypass structure of the fan assembly, one of a plurality of vanes that extend radially inward from the core casing, and a split retention ring segment that is coupled to the split fan case segment with a fastener and engaged with the vanes to allow the vanes to move radially outward with split fan case during disassembly.
Figure 3:
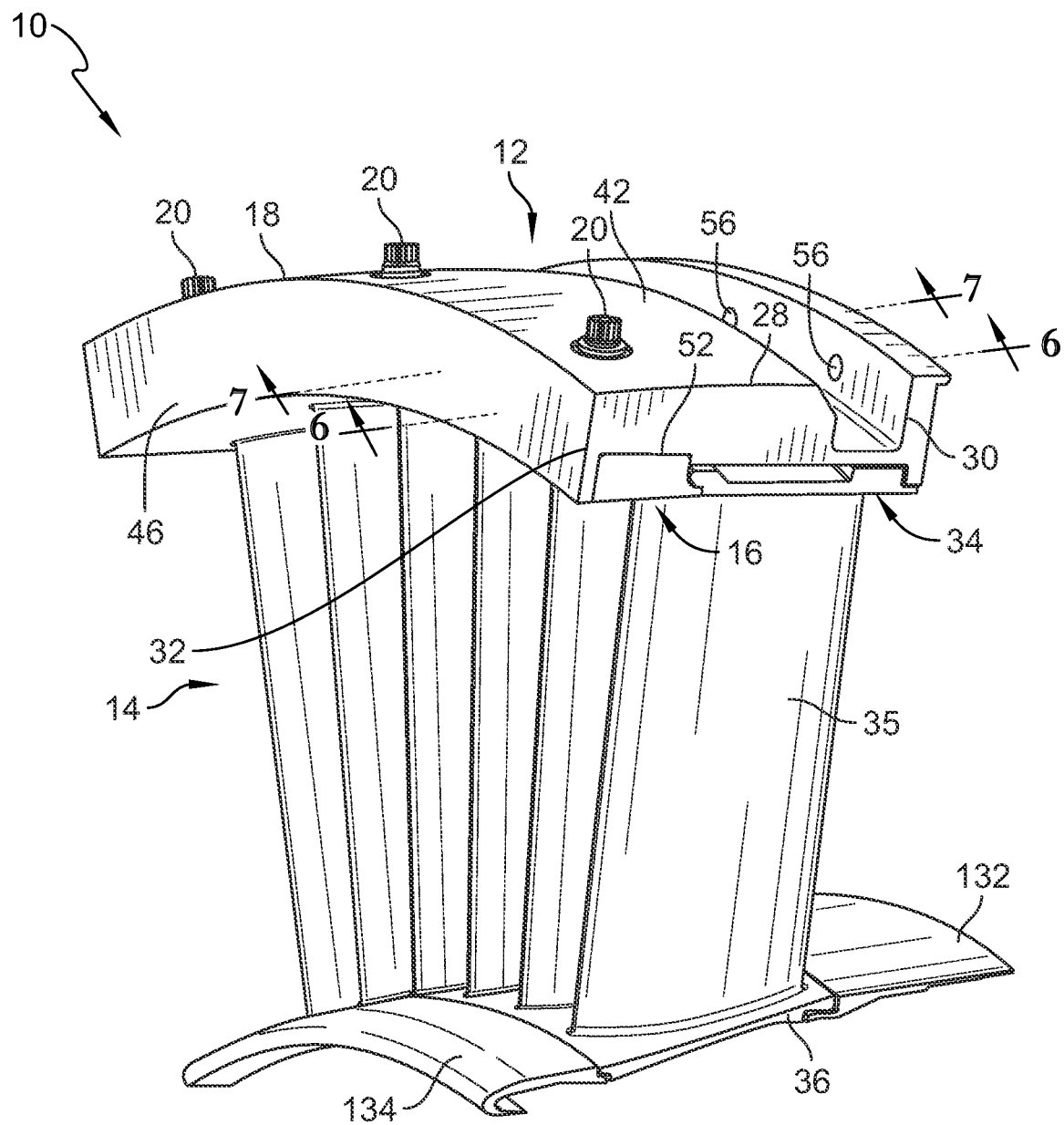
FIG. 3 is a perspective view of the guide vane assembly of FIG. 2 showing the plurality of vanes engaged with the split fan case segment and the split retention ring segment, the split retention ring segment coupled to the split fan case segment with fasteners, and further showing the plurality of vanes simply supported on the core casing.

A guide vane assembly 10 adapted for use in a gas turbine engine 110 is shown in FIGS. 1-3. The guide vane assembly 10 is configured to redirect airflow in a fan assembly 112 of the gas turbine engine 110. The guide vane assembly 10 of the present disclosure is segmented and configured to be removed radially away from an engine core 114 and a fan rotor 116 to allow the components of the guide vane assembly 10 to be removed and/or replaced without dissembling the entire fan rotor 116 and fan assembly 112. A plurality of guide vane assembly 10 are located adjacent one another circumferentially to form a ring of vanes for the gas turbine engine 110.

The gas turbine engine 110 of the present disclosure includes a plurality of the segmented guide vane assemblies 10. In contrast, fan assemblies for conventional gas turbine engines may be designed such that the guide vane assembly and fan case are assembled by translating the components axially into interlocking engagement with one another and then coupling the sub-assembly to the bypass structure/and or engine core. As a result, the entire fan assembly of conventional engines, including fan blades and a fan wheel, is completely removed when the guide vane assembly is disassembled for maintenance or inspection. The guide vane assembly 10 of the present disclosure allows for radial remove and reassembly of the guide vane assembly 10 without teardown and/or assembly of other components of the fan assembly 112.

The guide vane assembly 10 includes a split fan case 12, a plurality of vanes 14, and a split retention ring segment 16 as shown in FIGS. 2-5. The split fan case 12 is configured to support the plurality of vanes 14 and allow the guide vane assembly 10 to be removed radially from the other components of the fan assembly 112. The plurality of vanes 14 redirect airflow in the fan assembly 112. The split retention ring is removably coupled to the split fan case 12 and is engaged with the plurality of vanes 14 to block radial movement of the plurality of vanes 14 away from the split fan case 12.

Referring again to FIG. 1, the guide vane assembly 10 is part of engine 110 which includes the fan assembly 112 and the engine core 114. The fan assembly 112 provides thrust for propelling an aircraft coupled with the engine 110. The engine core 114 compresses air, mixes fuel with the air, and ignites the fuel to power the fan assembly 112.

The fan assembly 112 includes the fan rotor 116, the guide vane assembly 10, and a bypass structure (duct) 118 as shown in FIG. 1. The fan assembly 112 includes a fan wheel 120 and a plurality of fan blades 122 that extend radially outward from the fan wheel 120. The fan assembly 112 rotates about a central axis 11 to generate thrust and propel the aircraft. The guide vane assembly 10 is configured to adjust a direction of air exiting the fan rotor 116 to reduce swirl of the air propelled by the fan rotor 116. The bypass structure 118 is arranged circumferentially about the central axis 11 and is radially outward of the fan rotor 116 to direct the air aft of the engine 110.

The engine core 114 includes a compressor 124, a combustor 126, a turbine 128, and a core casing 130 as shown in FIG. 1. The compressor 124 compresses and delivers air to the combustor 126. The combustor 126 then mixes fuel with the compressed air and ignites the fuel. The hot, high-pressure products of the combustion reaction in the combustor 126 are directed into the turbine 128 to cause the turbine 128 to rotate about the central axis 11 and drive the compressor 124 and the fan assembly 112. The core casing 130 extends circumferentially about the central axis 11 and is located radially inward of the bypass structure 118.

The core casing 130 includes, among other things, a forward axial segment 132 (illustratively a core vane) and an aft axial segment 134, which support the plurality of vanes 14 as shown in FIGS. 2 and 3. The forward axial segment 132 includes a curved nose 142, vanes 144 that extend radially inward, and a ledge 146 to support the plurality of vanes 14 of the guide vane assembly 10. The aft axial segment 134 extends primarily axially aft and includes a ledge 148 to engage the plurality of vanes 14 of the guide vane assembly 10. The ledges 146, 148 are spaced apart axially to define a gap 136 therebetween to receive and simply support each vane 14. The forward axial segment 132 and the aft axial segment 134 do not radially overlap each vane 14 so as to allow the plurality of vanes 14 to move radially outward away from the forward axial segment 132 and the aft axial segment 134 when the guide vane assembly 10 is removed and similarly allow radial inward movement when the guide vane assembly 10 is assembled/reassembled.

The guide vane assembly 10 includes the split fan case segment 12, the plurality of vanes 14, and the split retention ring segment 16, as shown in FIGS. 2-5. The split fan case segment 12 is coupled to the bypass structure 118. The plurality of vanes 14 extend radially between the split fan case segment 12 and the core casing 130. The split retention ring segment 16 is coupled to the split fan case segment 12 and is engaged with the plurality of vanes 14 to couple the vanes 14 with the split fan case segment 12 and cause the vanes 14 to move radially outward with the split fan case segment 12 during assembly and disassembly.

The split fan case segment 12 extends circumferentially only partway about the central axis 11 as shown in FIG. 3. The split fan case segment 12, as shown in FIGS. 2-6, includes a fan case body 18, fasteners 20, and pins 22. The fan case body 18 is configured to couple with the split retention ring segment 16 and the plurality of vanes 14. The fasteners 20 couple the fan case body 18 to the split retention ring segment 16. The pins 22 couple the fan case body 18 to the plurality of vanes 14.

The fan case body 18, as shown in FIGS. 2-7, includes a support band 28, a mount flange 30, and a locator lip 32. The support band 28 engages with and couples to the split retention ring segment 16. The mount flange 30 engages with and couples to both the plurality of vanes 14 and the bypass structure 118. The locator lip 32 extends radially inward and engages the split retention ring segment 16 to locate axially the split retention segment 16.

The support band 28 of the split fan case 12, as illustrated in FIGS. 2-7, includes a radial outer surface 42, a radial inner surface 44, a forward axial end 46, an aft axial end 48, fastener holes 50, and a cutout 52. The radial inner surface 44 engages with the split retention ring segment 16. The forward axial end 46 engages with the fan assembly 112. The aft axial end 48 defines a gap with mount flange 30. The fastener holes 50 are configured to receive fasteners 20 and extend radially inward from the radial outer surface 42 to the radial inner surface 44. The cutout 52 extends radially outward into the radial inner surface 44 and is configured to receive the retention ring segment 16. The locator lip 32 extends radially inward from the forward axial end 46 of the support band 28 and engages with the split retention ring segment 16.

Figure 5:
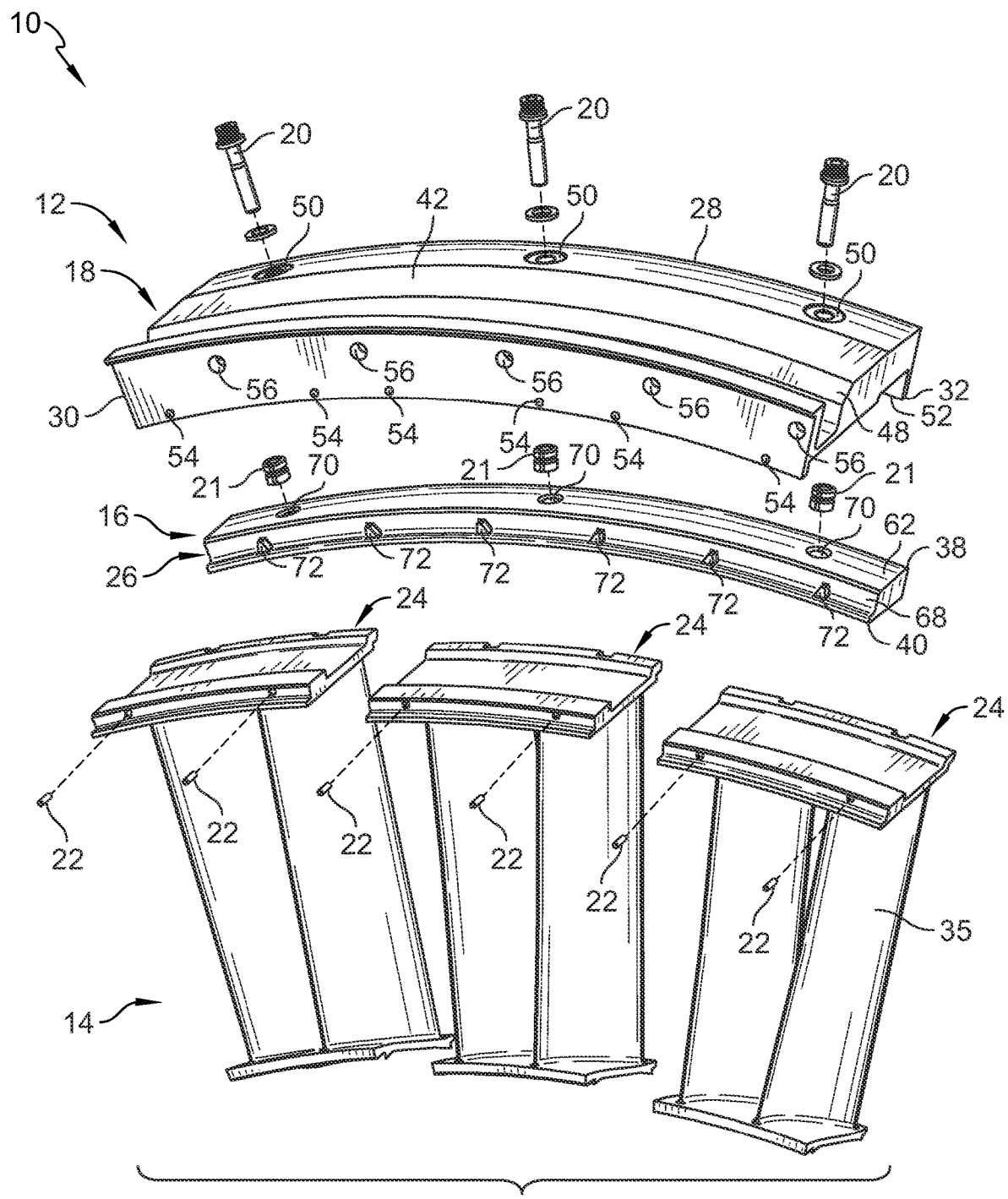
FIG. 5 is an exploded rear view of the fan vane assembly of FIG. 3.
Figure 6:
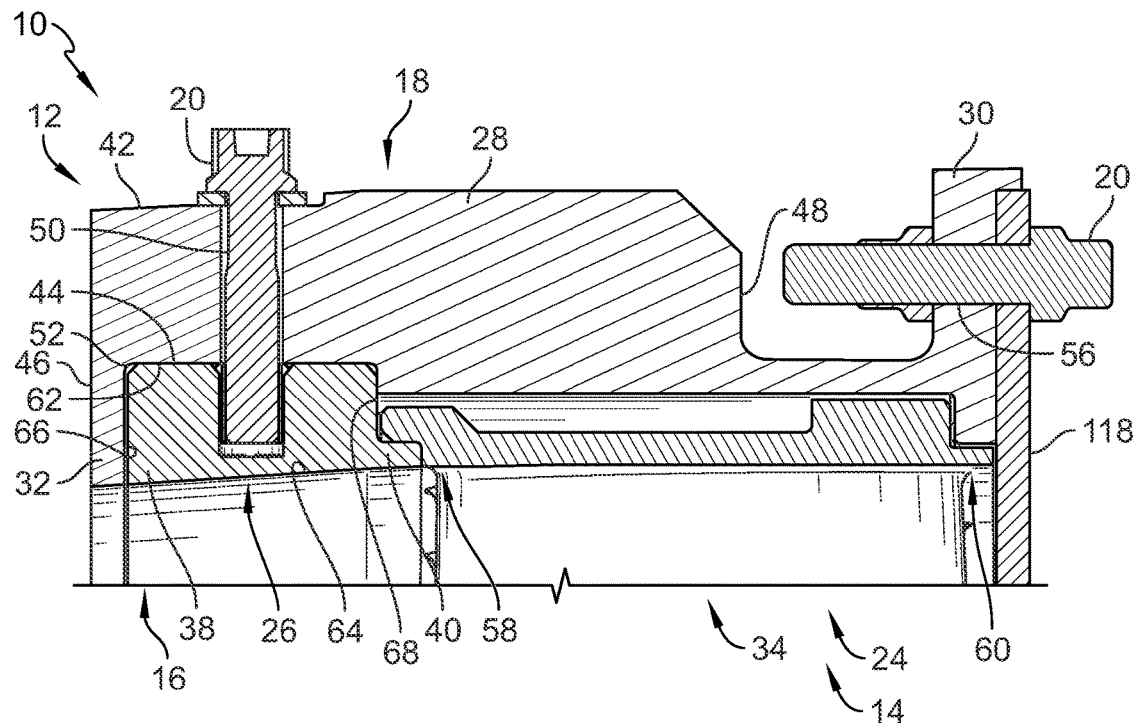
FIG. 6 is a detailed cross-sectional view of a radial outer portion of the guide vane assembly taken along line 6-6 of FIG. 3 showing one of the fasteners extending radially through the fan case body and into the split retention ring segment to removably couple the split retention ring segment with the fan case body, and further showing the vane coupled to the split retention ring segment at a radially outer end of the vane.
Figure 7:
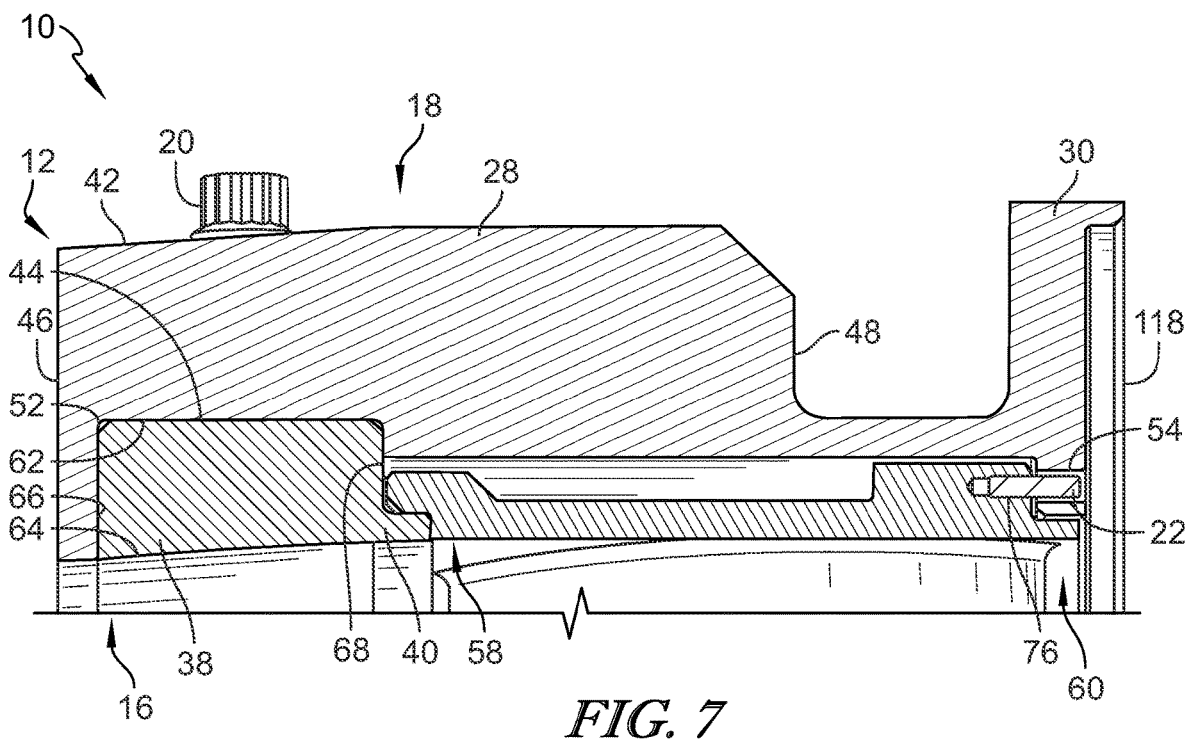
FIG. 7 is another detailed cross-sectional view of the outer portion of the guide vane assembly taken along line 7-7 of FIG. 3 showing that the fan case body of the split fan case segment is coupled to the vane with a pin that extends axially into the fan case body and the vane to block movement of the vane relative to the fan case body.

The mount flange 30 of the split fan case 12, as illustrated in FIGS. 6 and 7, includes pin holes 54 and fastener holes 56. The pin holes 54 are configured to receive pins 22 to couple the split fan case segment 12 to the plurality of vanes 14. The fastener holes 56 are configured to receive the fasteners 20 to couple the split fan case segment 12 to the bypass structure 118. In some embodiments, pin holes 54 are circular as shown in FIG. 5 and, in some embodiments, pin holes 54 are slots/longer in a major axis as compared to a length of the hole in a perpendicular minor axis.

Figure 4:
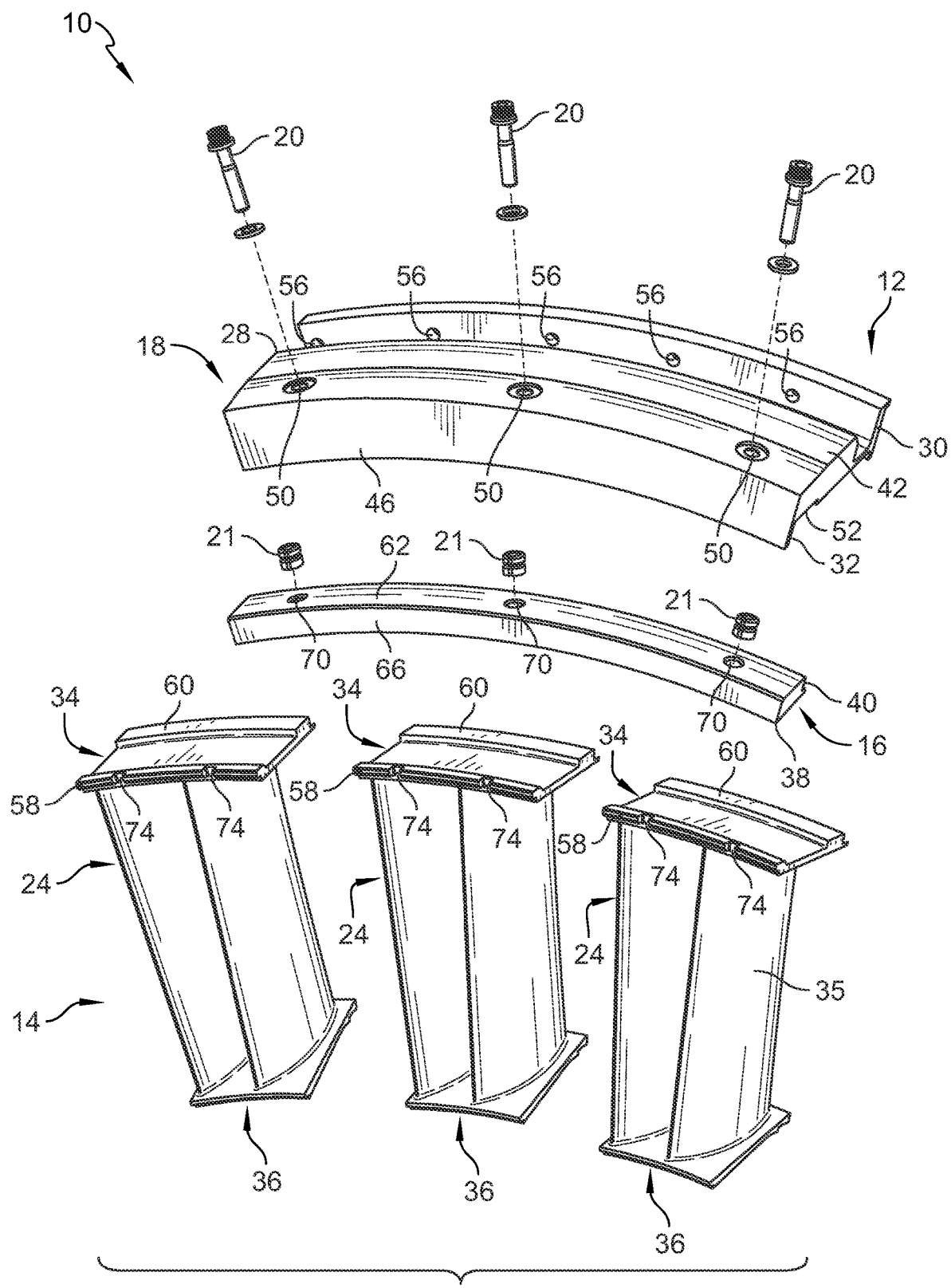
FIG. 4 is an exploded front view of the fan vane assembly of FIG. 3 showing the split fan case segment having a fan case body and the plurality of fasteners, the split retention ring segment, the plurality of vanes, a plurality of pins for coupling the fan case body and the plurality of vanes, and the core casing having a forward axial segment and an aft axial segment.

The plurality of vanes 14, as shown in FIG. 4-5, include a plurality of doublets 24. Each doublet 24 is configured to couple with the split fan case segment 12 and the split retention ring segment 16, and engage with the core casing 130. Each doublet 24 includes a radial outer platform 34, airfoils 35, and a radial inner platform 36. The radial outer platform 34 couples with split fan case segment 12 and split retention ring segment 16. The radial inner platform 36 is simply supported by the forward axial segment 132 and aft axial segment 134 of the core casing 130. The airfoils 35 extend radially between and interconnect the radial outer platform 34 and the radial inner platform 36. In other embodiments, the vanes 14 maybe formed as singlets, triplets, etc.

Figure 9:
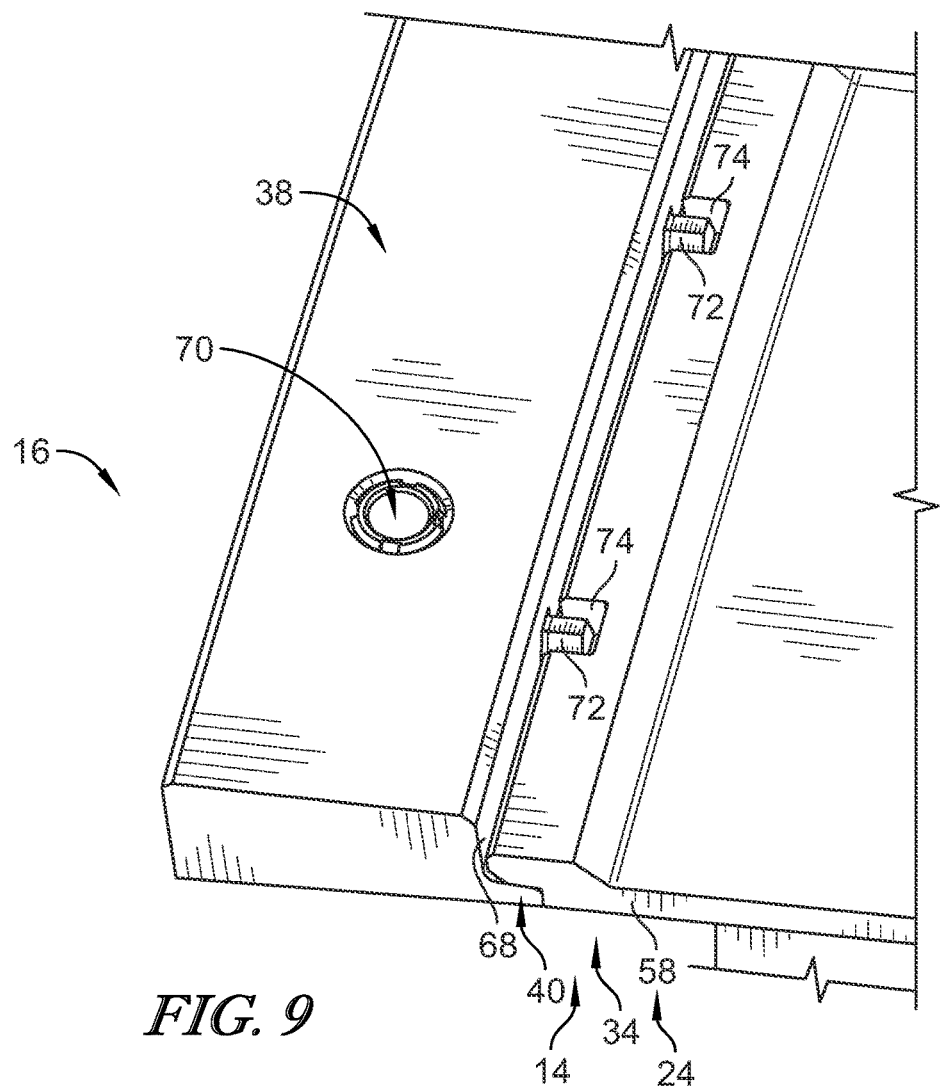
FIG. 9 is another detailed perspective view of a portion of the split retention ring segment and one of the plurality of vanes of the guide vane assembly of FIGS. 2-6 showing the anti-rotation feature extending into a cutout of the vane to block circumferentially movement of the vane relative to the split retention ring segment.

As illustrated in FIGS. 6-7, the radial outer platform 34 of each doublet 24 includes a forward axial end 58 and an aft axial end 60. The forward axial end 58 couples to the split retention ring segment 16. The aft axial end 60 couples to the mount flange 30 of the split fan case segment 12. The forward axial end 58 includes anti-rotation cutouts 74 as shown in FIGS. 4 and 9, which receive the split retention ring segment 16 to prevent circumferential movement of the doublet 24 relative to the split retention ring segment 16. The aft axial end 60 includes pin holes 76 which receive pins 22 from the split fan case segment 12 to secure the mount flange 30 to the aft axial end 60 of the radial outer platform 34. As shown in FIG. 7, the bypass structure 118 abuts the mount flange 30 and blocks the pins 22 from escaping out of the pin holes 76.

The split retention ring segment 16, as shown in FIGS. 2-9, includes a connector band 38 and an anti-rotation flange 40. The connector band 38 couples to both the split fan case segment 12 and the plurality of vanes 14. The anti-rotation flange 40 couples to the plurality of vanes 14 and extends axially aft towards the plurality of vanes 14.

Figure 8:
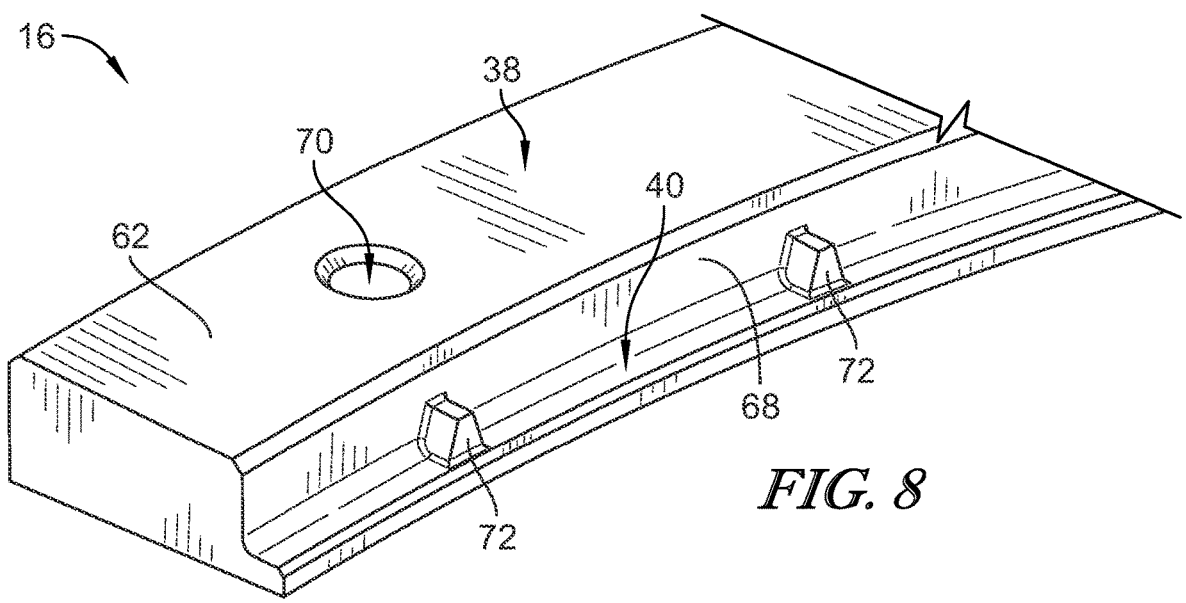
FIG. 8 is a detailed perspective view of a portion of the split retention ring segment of FIGS. 2-6 showing an anti-rotation feature of the split retention ring.

The connector band 38, as shown in FIGS. 8 and 9, includes a radial outer surface 62, a radial inner surface 64, a forward axial end 66, an aft axial end 68, and fastener holes 70. The radial outer surface 62 engages with the radial inner surface 44 of the support band 28. The forward axial end 66 and the aft axial end 68 are spaced apart such that the connector band 38 can fit into the cutout 52 of the support band 28. The fastener holes 70 are configured to receive fasteners 20 and retainers 21. The fastener holes 70 extend radially inward partway from the radial outer surface 62 towards the radial inner surface 64.

The anti-rotation flange 40, as illustrated in FIGS. 8-9, includes anti-rotation features 72. The anti-rotation features 72 are configured to fit into the anti-rotation cutouts 74 of the plurality of vanes 14. When engaged, the anti-rotation features 72 and the anti-rotation cutouts 74 block circumferentially movement of the plurality of vanes 14 relative to the split retention ring segment 16. Illustratively, the anti-rotation features 72 are tabs that extend radially outward away from the anti-rotation flange 40 and axially away from the connector band 38.

Figure 12:
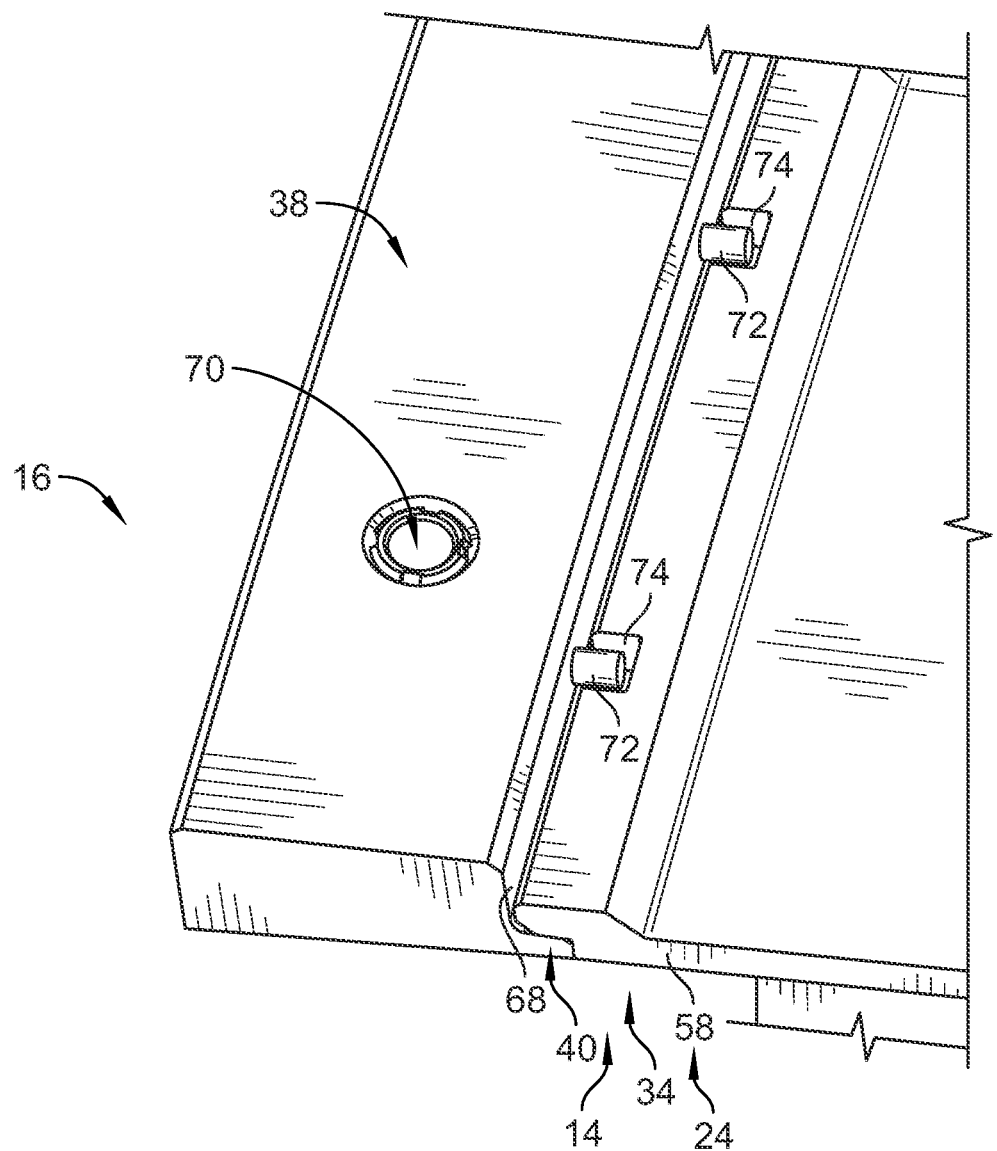
FIG. 12 is a detailed perspective view of a portion of another split retention ring segment and one of the plurality of vanes of the guide vane assembly showing the anti-rotation feature is a pin that extends out of the split retention ring segment and into the cutout of the vane to block circumferentially movement of the vane relative to the split retention ring segment.

In other embodiments, the anti-rotation features 72 are pins as shown in FIG. 12. The pins illustratively extend out of the connector band 38 and into the anti-rotation cutouts 74 formed in the plurality of vanes 14 to block circumferential movement of the vanes 14 relative to the split retention ring segment 16.

During assembly, the axial end of the outer platform 34 included in the vane 14 is coupled to the split fan case segment 12. The split retention ring segment 16 is translated radially into engagement with the split fan case segment 12 and a second axial end 58 of the outer platform 34. The split retention ring segment 16 is coupled with the split fan case segment 12 after the translating step. Coupling the retention ring segment 16 with the split fan case segment 12 includes inserting a fastener 20 radially inward through the split fan case segment 12 and into the split retention ring segment 16 in the illustrative embodiments. The split fan case segment 12, split retention ring segment 16, and the vane 14 may then be moved radially inward together toward the central axis 11 with the rotatable fan already installed on the gas turbine engine 110. The split fan case segment 12 is coupled with the bypass structure 118 of the gas turbine engine 110 while the rotatable fan remains installed on the gas turbine engine 110. Disassembly of the guide vane assembly 10 from the gas turbine engine 110 can be achieved by performing the steps in reverse order.

Figure 10:
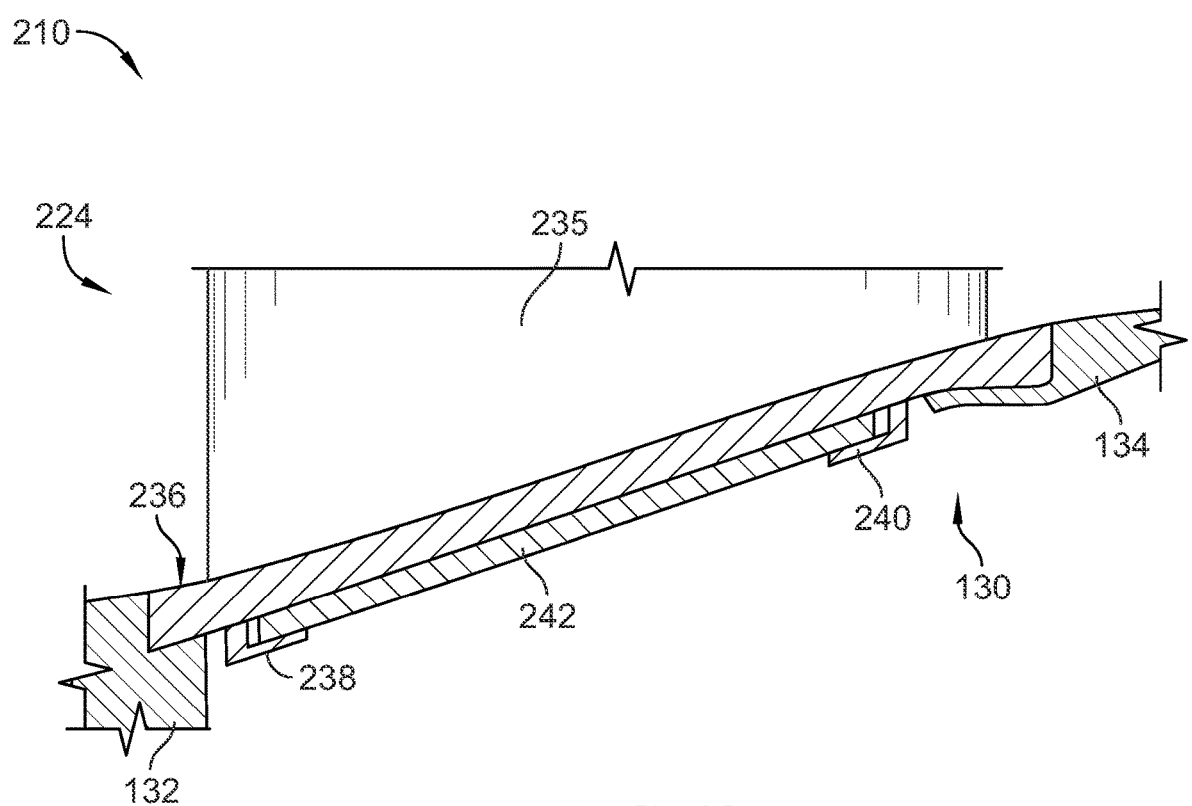
FIG. 10 is a cross-sectional view of a radial inner portion of an embodiment of a guide vane assembly showing the vane and the core casing, the core casing having a forward axial segment and an aft axial segment supporting the vane, and the plurality of vanes secured to one another with a circumferential band.

A second embodiment of the guide vane assembly 210 and the core casing 130 is shown in FIG. 10. The guide vane assembly 210 is similar to the guide vane assembly 10 shown in FIGS. 1-9 and described herein. Accordingly, similar reference numbers in the 200 series indicate features that are common between the guide vane assembly 210 and the guide vane assembly 10. The description of the guide vane assembly 10 is incorporated by reference to apply to the guide vane assembly 210, except in instances when it conflicts with the specific description and the drawings of the guide vane assembly 210.

The guide vane assembly 210 includes doublets 224 having a radial outer platform, airfoils 235, and a radial inner platform 236 as shown in FIG. 10. Radial inner platform 236 includes a forward track 238 and an aft track 240 spaced apart axially from the forward track 238. The guide vane assembly 210 further includes a circumferentially extending band 242 that extends into the forward track 238 and the aft track 240 of several doublets 224 to couple the doublets 224 together to reduce movement of the doublets 224 during assembly/disassembly of the guide vane assembly 210.

Figure 11:
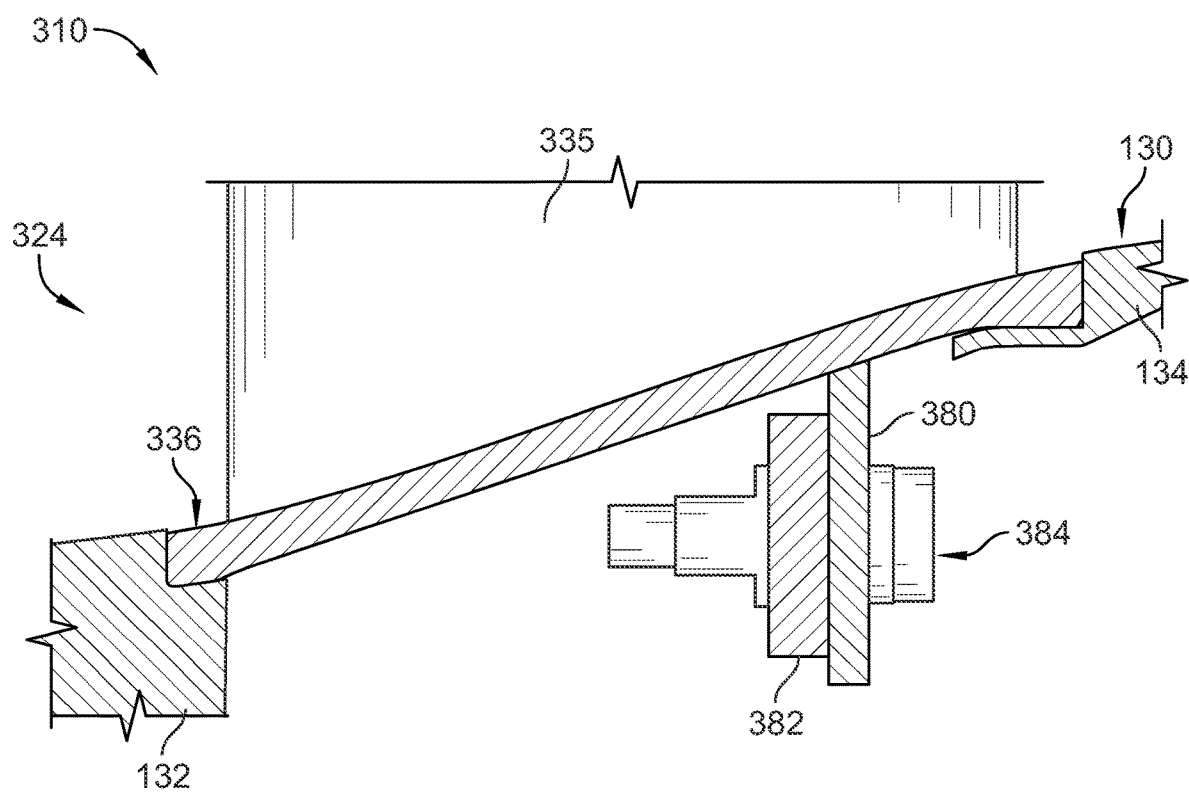
FIG. 11 is a cross-sectional view of a radial inner portion of another embodiment of a guide vane assembly showing the vane supported on a forward axial segment and an aft axial segment of the core casing and the plurality of vanes secured to one another with a bolted flange assembly.

A third embodiment of the guide vane assembly 310 and the core casing 130 is shown in FIG. 11. The guide vane assembly 310 is similar to the guide vane assembly 10 shown in FIGS. 1-9 and described herein. Accordingly, similar reference numbers in the 300 series indicate features that are common between the guide vane assembly 310 and the guide vane assembly 10. The description of the guide vane assembly 10 is incorporated by reference to apply to the guide vane assembly 310, except in instances when it conflicts with the specific description and the drawings of the guide vane assembly 310.

The guide vane assembly 310 includes doublets 324 having a radial outer platform, airfoils 335, and a radial inner platform 336 as shown in FIG. 11. Radial inner platform 336 further includes a mount flange 380 that extends radially inward toward the axis 11. The guide vane assembly 310 further includes a circumferentially extending band 382 that extends along the mount flanges 380 of several doublets 324. The guide vane assembly 310 further includes fasteners 384 that extend into the mount flange 380 and the band 382 to couple each doublet 324 to the band 382 to couple the doublets 324 together to reduce movement of the doublets 324 during assembly/disassembly of the guide vane assembly 310.

The present disclosure provides features to re-configure a vane assembly arrangement so that the vanes remain attached to the fan case after the split flanges are unbolted, while also allowing for easy replacement/exchange of unique definitions on a table. Non-structural outlet guide vanes and other vane assemblies may be typically 'fit and forget' parts as long as they do not become damaged, for example, by bird strike or foreign objects. They may have attachment configurations that allow for removal and replacement only after the fan rotor is removed, taking off rings or bolts that restrain them at the inner diameter and then rotating them out of the case.

The present disclosure may be particularly well suited to engines that may see heavy guide vane damage and/or need particular guide vane setups for specific missions. As inlet distortion become more complex and if an engine was common across multiple platforms, it may be possible to custom an engine's guide vane tuning to a particular mission in a different aircraft rather than have two unique powerplants. If an engine was putting on a low detection inlet or had a different high speed inlet, then the guide vanes might be changed out to better suit the application.

A benefit to this particular arrangement may be that it targeted having as little interruption to the flowpath as possible. The radial projection from the aft flange of the case stops short of the flowpath in the illustrative embodiments so that the platform makes it up until the front frame start. This may allow for maximum chord on the platform. The pin provides radial and circumferential restraint during assembly until retention ring is installed to help ensure the guide vanes are held in place during lift/install to frame.

The retention ring provides radial and axial support to the front of the platform, but also has circumferential clocking. The inner platform may include axial stops near the splitter nose of the core casing and the front of the bypass flow assembly. An inner band may hold the vanes 14 together circumferentially, axially, and radially.

The fan case 12 and guide vanes 14 can be installed on the rest of the static assembly without interference. This may allow it to be assembled over a fan rotor, so that changes can occur quickly to the fan case liners and guide vanes with limited effort.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising:
a bypass structure arranged circumferentially about an axis,
a core casing that extends circumferentially about the axis and located radially inward of the bypass structure to define a flow path radially between the bypass structure and the core casing, and
a guide vane assembly coupled with the bypass structure and configured to be removed radially away from the bypass structure and the core casing, the guide vane assembly including a split fan case segment that extends circumferentially partway about the axis, a vane that extends radially inward away from the split fan case segment, and a split retention ring segment that extends circumferentially partway about the axis,
wherein the split fan case segment is coupled with the bypass structure, the vane extends between a radially inner end that is supported on the core casing and a radially outer end that is supported by the split fan case segment, and the split retention ring segment is coupled with the split fan case segment and engaged with the radially outer end of the vane to block radial movement of the vane away from the split fan case segment, and
wherein the vane is simply supported by the core casing without being coupled to the core casing to allow the vane to move radially outward with the split fan case segment away from the core casing during removal of the guide vane assembly from the bypass structure.

2. The gas turbine engine assembly of claim 1, wherein the split fan case segment includes a fan case body and a fastener that extends radially through the fan case body and into the split retention ring segment to removably couple the split retention ring segment with the fan case body.

3. The gas turbine engine assembly of claim 2, wherein the split fan case segment further includes a pin that extends axially into the fan case body and the vane to block movement of the vane relative to the fan case body.

4. The gas turbine engine assembly of claim 3, wherein the core casing is formed to include a first axial lip and a second axial lip spaced apart from the first axial lip to define an opening between the first axial lip and the second axial lip and the radially inner end of the vane is located in the opening and engages the first axial lip and the second axial lip.

5. The gas turbine engine assembly of claim 1, wherein the vane includes an airfoil and a platform that extends circumferentially away from the airfoil to define the radially outer end of the vane, the split retention ring segment includes a band fastened with the split fan case segment and a flange that extends axially away from the band, and the flange of the split retention ring segment engages and supports the platform included in the vane.

6. The gas turbine engine assembly of claim 5, wherein the platform is formed to include a cutout that extends radially and axially into the platform, the split retention ring segment includes an anti-rotation feature coupled with one of the band and the flange, and the anti-rotation feature extends into the cutout to block circumferential movement of the vane relative to the split retention ring segment.

7. The gas turbine engine assembly of claim 1, wherein the vane includes an airfoil, an outer platform that extends circumferentially partway about the axis, and an inner platform that extends circumferentially partway about the axis, the outer platform includes a first axial end and a second axial end spaced apart axially from the first axial end, the first axial end is coupled with the split fan case segment for movement therewith, and the second axial end is interlocked between the split fan case segment and the split retention ring segment.

8. The gas turbine engine assembly of claim 1, wherein the radially outer end of the vane is coupled to the split retention ring segment at a first axial end and coupled with the split fan case segment at a second axial end.

9. The gas turbine engine assembly of claim 1, wherein the core casing is formed to include a first lip and a second lip spaced apart from the first lip to define an opening between the first lip and the second lip, and wherein the radially inner end of the vane is arranged to lie in the opening for support.

10. A guide vane assembly adapted for a gas turbine engine, the guide vane assembly comprising:
a split fan case segment that extends circumferentially partway about an axis,
a vane that extends radially inward away from the split fan case segment, the vane including an airfoil and an outer platform that has a first axial end and a second axial end spaced apart from the first axial end, the first axial end is coupled with the split fan case segment for movement with the split fan case segment, and the second axial end is formed to include a cutout that extends radially and axially into the second axial end of the outer platform, and a split retention ring segment that extends circumferentially partway about the axis, the split retention ring segment is coupled with the split fan case segment and engaged with the second axial end of the outer platform included in the vane to interlock the outer platform of the vane between the split fan case segment and the split retention ring segment, wherein the split retention ring segment includes an anti-rotation feature configured to engage the cutout formed in the second axial end of the outer platform to prevent circumferential movement of the vane relative to the split retention ring segment.

11. The guide vane assembly of claim 10, wherein the split fan case segment includes a fan case body and a fastener that extends radially through the fan case body and into the split retention ring segment to couple the split retention ring segment with the fan case body.

12. The guide vane assembly of claim 10, wherein the split fan case segment includes a fan case body and a fastener that extends axially into the fan case body and the first axial end of the outer platform included in the vane to couple the vane with the fan case body.

13. The guide vane assembly of claim 10, wherein the split retention ring segment is removably coupled with the split fan case segment to allow for radial translation of the split retention ring segment away from the split fan case segment.

14. The guide vane assembly of claim 10, wherein the split retention ring segment includes a band fastened with the split fan case segment and a flange that extends axially away from the band and the flange of the split retention ring segment engages and supports the outer platform included in the vane.

15. The guide vane assembly of claim 14, wherein the anti-rotation feature is coupled with at least one of the band and the flange, and the anti-rotation feature extends into the cutout.

16. The guide vane assembly of claim 15, wherein the anti-rotation feature comprises a tab that extends radially away from the flange and axially away from the band.

17. The guide vane assembly of claim 10, wherein the split retention ring segment defines a portion of an air flow path in the gas turbine engine.

18. A method comprising:
coupling a first axial end of an outer platform included in a vane to a split fan case segment,
translating radially a split retention ring segment into engagement with the split fan case segment and a second axial end of the outer platform included in the vane,
coupling the split retention ring segment with the split fan case segment after the translating step, and
supporting an inner platform of the vane in an opening formed in a core casing that is located radially inward of the split fan case segment to define a flow path radially between the split fan case segment and the core casing, the opening of the core casing being defined between a first lip and a second lip of the core casing, the inner platform of the vane being simply supported in the opening of the core casing by engaging the first lip and the second lip without coupling the vane to the core casing to allow the vane to move radially outward with the split fan case segment away from the core casing during removal of the vane.

19. The method of claim 18, wherein coupling the split retention ring segment with the split fan case segment includes inserting a fastener radially inward through the split fan case segment and into the split retention ring segment.

20. The method of claim 19, further includes moving the split fan case segment, split retention ring segment, and the vane radially inward together toward a central axis with a rotatable fan installed on a gas turbine engine and coupling the split fan case segment with the gas turbine engine while the rotatable fan remains installed on the gas turbine engine.

* * * * *